June 26, 1956  L. PETERS  2,752,251
SOFT PLASTIC FOOD PACKAGE
Filed June 29, 1953  2 Sheets-Sheet 1
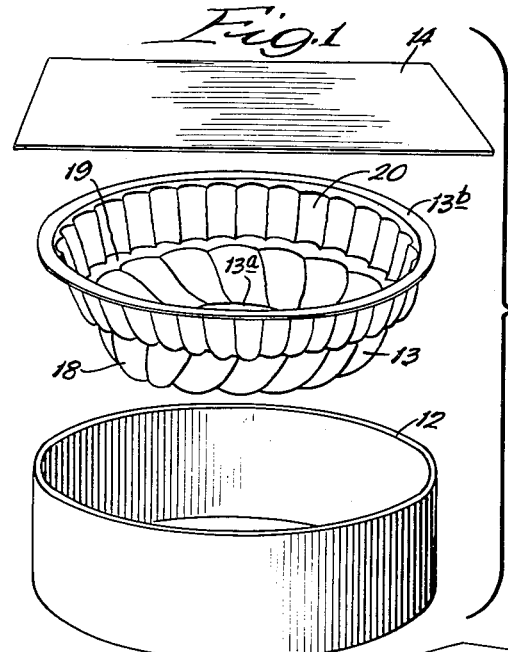
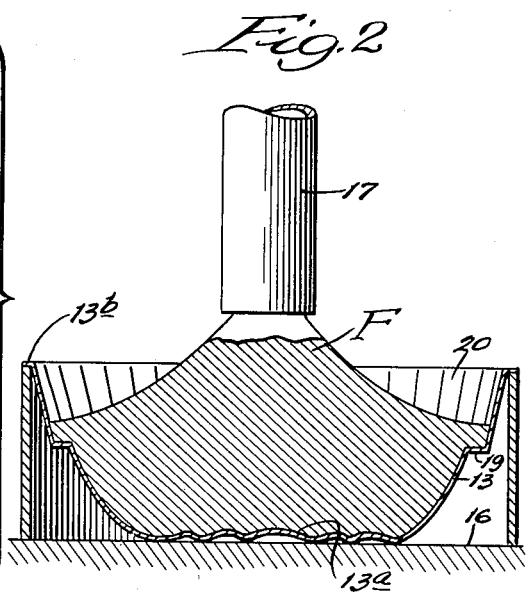
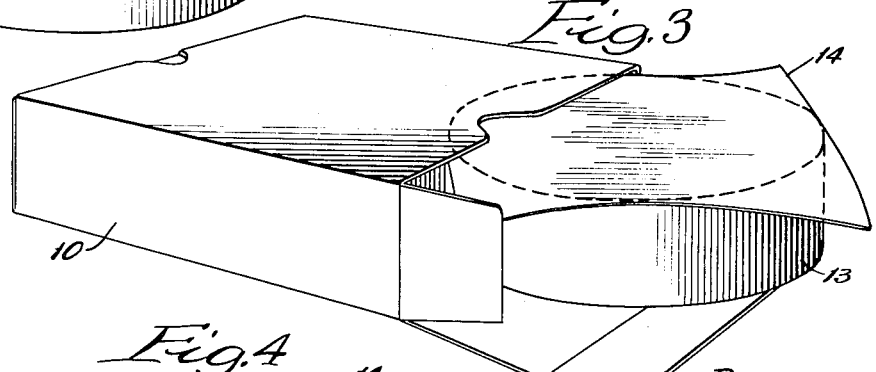
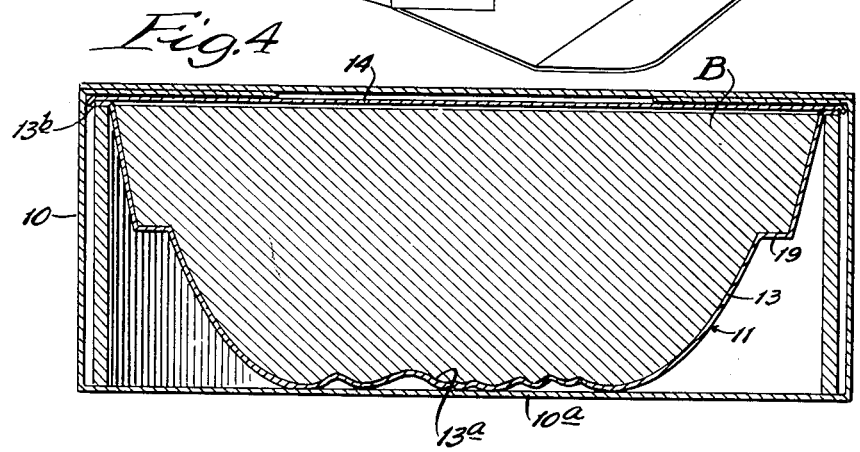
INVENTOR:
Leo Peters,
BY
Dawson, Tilton & Graham,
ATTORNEYS.

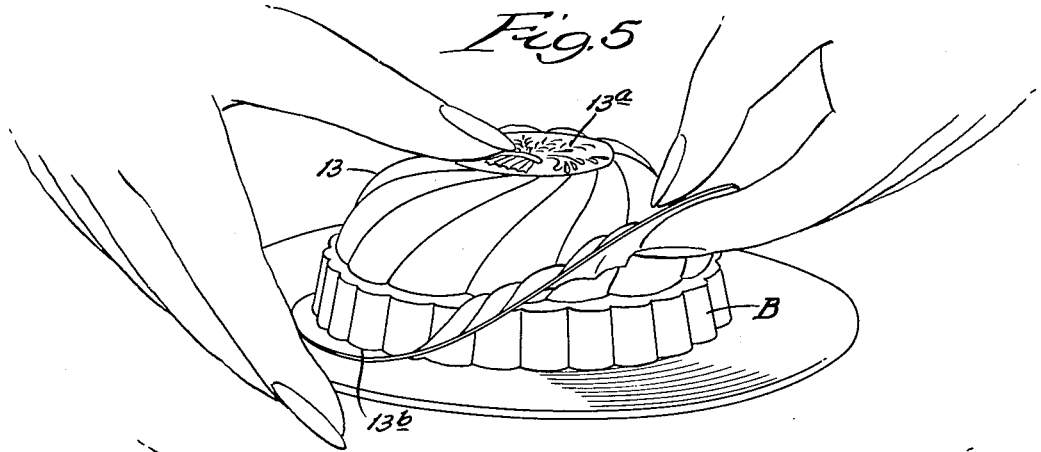
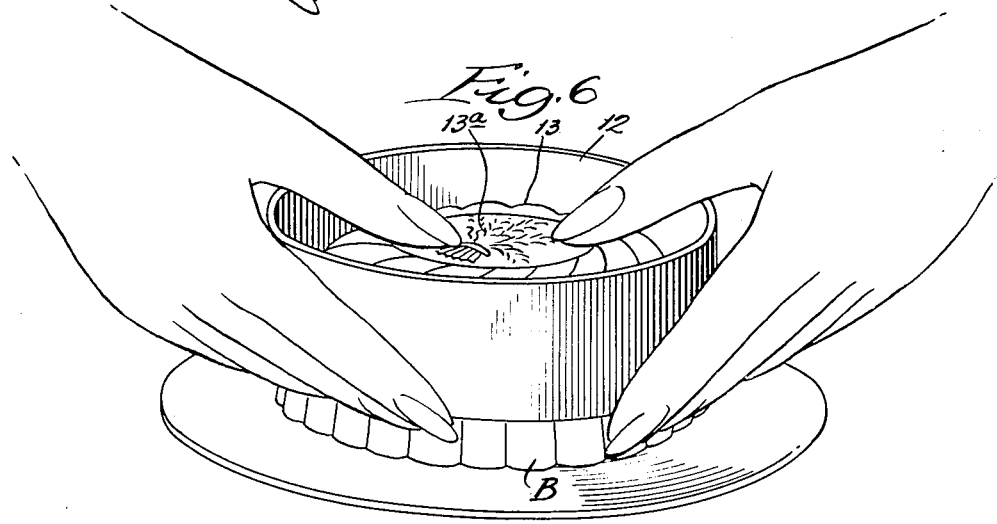
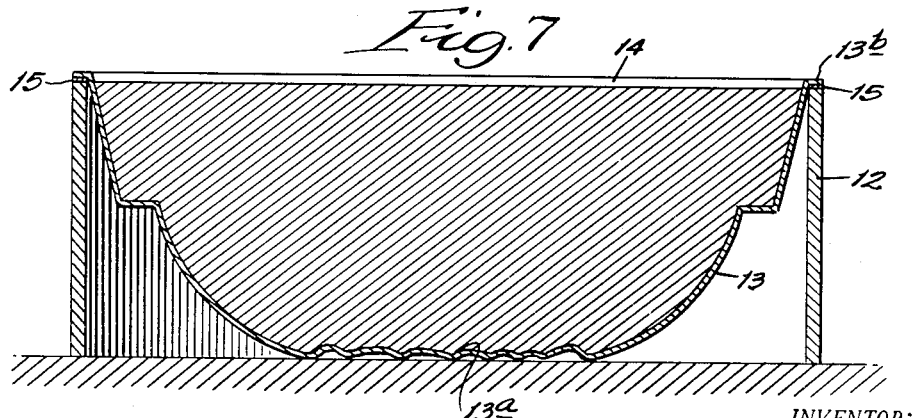

United States Patent Office 2,752,251
Patented June 26, 1956

2,752,251

SOFT PLASTIC FOOD PACKAGE

Leo Peters, Evanston, Ill.

Application June 29, 1953, Serial No. 364,799

4 Claims. (Cl. 99—171)

This invention relates to a soft plastic food package and method of packaging a soft plastic food in a collapsible film pocket.

I have heretofore disclosed the idea of molding, carrying, and dispensing soft plastic foods in reversible pockets formed of thin, flexible film. This application discloses a further embodiment and improvement of this type of package structure and method of packaging and dispensing soft plastic foods.

In forming soft plastic food packages with reversible film pockets, especially when ornamental designs are impressed on the walls of the pocket, it is preferred not to provide the pocket with a conforming backing. Such unbacked film pockets because of the high degree of flexibility required to make them reversible, are also collapsible and will not maintain themselves in an erect position under the weight of soft plastic food bodies within the pockets. Therefore, as I have heretofore disclosed, it is desirable to provide a relatively rigid support disposed about the pocket and supporting the pocket around the mouth thereof with the rest of the pocket at a spaced distance from the support. Further, it has been thought desirable to have the bottom of the pocket out of contact with any supporting surface, particularly with a non-shape-conforming surface when the pocket bottom is impressed with an ornamental design.

In the commercial distribution of soft plastic food packages having reversible film pockets supported in the manner just described, a problem has been encountered because of the tendency of pockets to rupture or tear at the bottom thereof. Because the pockets are formed by drawing a thermoplastic film into a die, the thinnest and therefore weakest portion of the pocket is at the bottom where the thickness of the film has been reduced to the greatest extent by the drawing operation. While under ordinary handling conditions such pockets are of sufficient strength to support the weight of soft plastic food bodies, under some extreme handling conditions it has been found that the pockets may develop breaks in the walls, particularly toward the bottom portions of the pockets. For example, this can occur when a carton containing this type of soft plastic food package is accidentally dropped onto a hard surface, causing a sudden jar or shock to be imparted to the soft plastic food body suspended within the pocket so that the soft plastic food body tends to suddenly force the bottom of the pocket downwardly.

It is therefore a general object of this invention to provide a soft plastic food package and method of packaging a soft plastic food in a collapsible food pocket which substantially overcomes the problem discussed above. More specifically, it is an object of this invention to provide a soft plastic food package which substantially overcomes the tendency of unbacked reversible film pockets to rupture under extremely rough handling conditions without at the same time limiting the scope of the designs which can be impressed on the walls of the film pocket or making it more difficult or expensive to change from one design to another. Further objects and advantages will appear as the specification proceeds.

This invention is shown in an illustrative embodiment in the accompanying drawing, in which—

Fig. 1 is a perspective view of the principal elements of a container structure embodying this invention, the elements being shown in separated relation; Fig. 2, a front sectional view showing the container elements of Fig. 1 assembled as they would appear when the film pocket is being filled with a soft plastic food; Fig. 3, a perspective view of a complete package assembly showing the filled container or inner package partially withdrawn from the outer carton; Fig. 4, a vertical sectional view of the complete package assembly as the inner package would appear within the outer carton; Fig. 5, a perspective view showing the dispensing of the soft plastic food body from the film pocket; Fig. 6, a perspective view showing the dispensing of the soft plastic food body from a modified package structure in which the top of the film pocket is adhesively attached to the tubular support; and Fig. 7, a vertical sectional view showing the modified package structure of Fig. 6 as it would appear prior to the removal of the closure film with the package resting on a flat horizontal surface.

As already indicated, this invention is concerned with a soft plastic food package, of the type wherein an unbacked, reversible pocket of thin, flexible film, such as thermoplastic film, is disposed within a hollow tubular support with the upper edge portion of the pocket in contact with the upper edge of the support and having a soft plastic food body within the pocket conforming to the shape thereof. More specifically, this invention is concerned with an improvement in a soft plastic food package of the type described, which improvement is characterized by the fact that film pocket is provided at its bottom with a generally flat area lying in substantially the same plane as the bottom edge of the support so that when the bottom edge of the support is placed on a flat supporting surface the flat bottom area of the pocket will also be in contact with the surface and be supported thereby.

Looking first mainly at Fig. 4 of the drawing by way of specific illustration, there is shown a soft plastic food package assembly comprising an outer carton 10 with an inner unitary food package therein designated generally by the number 11. Inner food package 11 consists of a vertically-extending, open-ended tubular support 12, a reversible pocket 13 formed of thin, flexible thermoplastic film, and a cover film 14 of thermoplastic material.

As shown in Fig. 4, pocket 13 tapers generally inwardly and downwardly from its mouth to a generally flat, horizontally-extending portion 13a at the bottom thereof. Pocket 13 is also provided with an upper peripheral portion or annular lip 13b which rests on the upper edge of tubular support 12. In the illustration given, lip 13b is unattached to support 12 and freely separable therefrom. However, lift 13b can be adhesively secured to the upper edge of support 12, as illustrated in the modified package structure of Figs. 6 and 7.

As illustrated in Fig. 4, bottom portion 13a preferably lies substantially in the same plane as the bottom edge of support 12 so that when package 11 is placed in an upright position on a flat horizontal supporting surface bottom portion 13a will be in contact with the surface and supported thereby. For example, in the complete package assembly of Fig. 4, pocket bottom 13a is in contact with and supported by the flat bottom 10a of carton 10.

In practicing this invention, a container can first be formed from a ring 12 and a film pocket 13, as shown in Fig. 1. These members are brought together in the relationship illustrated in Fig. 2. The collapsible film pocket is then filled with a soft plastic food as illustrated in Fig. 2. In this operation, the collapsible film pocket is positioned over a flat horizontal supporting surface, such as surface 16, with the bottom portion 13a of the pocket resting on the supporting surface. At the same time, film pocket 13 is supported at its top or steadied about the mouth thereof, for example, by the lip 13b of the pocket contacting the upper edge of support 12. While being supported in this manner the pocket is filled with a soft plastic food in flowable condition, as illustrated by the flow filling of food material F into pocket 13 from nozzle 17.

After the filling operation, a sealing or cover film 14 can be applied across the mouth of the pocket and sealed thereto to form a unitary package, as illustrated in Fig. 3. The filled pocket can then be moved into a carton, such as carton 10, having a flat bottom, such as bottom 10a, in such a way that the bottom portion 13a of the film pocket is brought into engagement with the bottom of the carton while the pocket continues to be steadied about its mouth by its engagement with the top of support 12. The appearance of the complete package assembly is illustrated more clearly in Fig. 4.

With the package construction just described, most of the weight of the food body within the film pocket is supported by the flat bottom portion of the pocket. For example, as shown in Fig. 4, the weight of the food body B is supported primarily by the flat bottom portion 13a of the pocket which in turn is supported by the flat bottom 10a of the carton 10. The main purpose of the engagement of pocket lip 13b with the upper end of support 12 in this construction is to steady the pocket around its mouth and prevent it from tipping or collapsing. Therefore, flat bottom portion 13a and peripheral portion 13b cooperate to support food body B. It has been found that this construction gives a greatly reduced tendency for the pocket to rupture due to an impact blow or shock by dropping the package assembly onto a hard surface. The flat base portion 13a of the pocket in effect acts as a shock absorber without allowing undue stresses to be applied to the thin bottom area of the pocket.

When it is desired to dispense the soft plastic food body, this can be done in the manner illustrated in Fig. 5. In this operation, the inner package is removed from carton 10, cover film 14 is separated, and the package is inverted. After the removal of ring 12, the pocket is progressively reversed to eject the food body. If desired, the reversal of the pocket can be promoted by pressing downwardly on the bottom of the pocket with the fingers or thumb of one hand while lifting lip 13b with the thumb and fingers of the other hand, as illustrated in Fig. 5. The flat bottom portion 13a of the pocket is of further advantage in this connection, since it provides a convenient area for pressing downwardly with the fingers, and tends to assist in preventing marring of the food body by the pressure of the fingers.

The package and method of this invention are particularly adapted for use with film pockets of the type described which are characterized by the further fact that the walls of the pockets including the horizontally-extending portions at the bottoms thereof are provided with indented ornamental designs. For example, pocket 13 is illustrated as having inwardly-curving arcuate scallops around the bottom of the side wall thereof, as at 18, with an offset or ridge 19 thereabove surmounted by a series of vertically-extending arcuate flutes 20. The bottom portion 13a of the pocket, as illustrated, is also preferably provided with an indented ornamental design. However, it is preferred that the design in the bottom portion of the pocket have a plurality of closely spaced points in all directions across the design lying in substantially the same plane as the bottom edge of the support and that these points are the outermost points of the design. The desired relationship is shown most clearly in Figs. 2 and 4 of the drawing where the design is seen to provide a series of points along the line of the section which are in contact with the supporting surface and are therefore in substantially the same plane as the bottom edge of support 12. Fig. 5 shows the nature of the whole design in bottom portion 13a.

One of the surprising results achieved by the package structure of this invention is that the flat bottom portion of the film pocket can effectively support the weight of the food body in the pocket while at the same time impressing an intricate design on the portion of the food body with which it is in supporting engagement. This is especially surprising when it is realized that the film pockets of this invention to be freely reversible are preferably not over .003 inch maximum thickness. The area of maximum thickness will be around the top or mouth of the pocket when as preferred the pockets are drawn from thermoplastic film of uniform thickness, while the bottom portions of the pocket will be of considerably lesser thickness. For example, a pocket drawn from a thermoplastic film having a thickness of .002" may have a thickness of only .0005" at the bottom thereof. Prior to the present invention it certainly would not have been expected that a thermoplastic film of the order of .0005" thick would support the weight of a soft plastic food body in the manner of the present structure.

As already described, in the package structure of this invention it is preferred to have the film pocket unattached to and freely separable from the support. This has particular advantage in the specific illustration given where annular lip 13b rests on the upper edge of ring 12. The free engagement of lip 13b on the upper edge of support 12 permits the lip to shift slightly relative to the support under extreme handling conditions while normally maintaining a frictional engagement which performs the function of steadying the pocket about its mouth and preventing it from collapsing. In other words, when the lip 13b is unattached to the upper edge of support 12, the weight of the food body is more completely transferred to pocket bottom portion 13a by the permitted flexing and relative movement of lip 13b. It has been found that this tends to reduce the rupturing of the upper portion of the pocket walls when the package is dropped or otherwise subjected to an impact blow tending to throw the weight of the food body downwardly against the pocket walls.

Figs. 6 and 7 illustrate a modification of the package structure previously described. In this modification, as shown more clearly in Fig. 7 annular lip 13b is adhesively attached to the upper edge of support 12 as indicated at 15. This construction may be desired for some purposes. When the top of the film pocket is thus adhesively attached to the support it is used to assist in ejecting the food body by the reversal of the pocket about the body in the manner illustrated in Fig. 6. Fig. 7 also illustrates how pocket bottom portion 13a will engage a flat horizontal surface upon which the soft plastic food package is resting.

While any thin, flexible thermoplastic film can be employed to form the reversible, food-receiving pockets employed in the packages of this invention, certain specific films are preferred, such as vinyl chloride-acetate copolymer films, ethylene glycol terephthalate films, etc.

While in the foregoing specification this invention has been described in relation to a specific preferred embodiment thereof, it will be apparent to those skilled in the art that the invention described herein is susceptible to other embodiments in which certain details can be varied from the details of the embodiment described herein.

I claim:

1. In a soft plastic food package, an outer carton having a flat bottom panel; a support received within said carton and providing a supporting edge portion surrounding an opening therein, a pocket of thin, flexible thermoplastic film having a peripheral portion about the mouth thereof in contact with the supporting edge of said support and being steadied thereby with the rest of said pocket being disposed below said supporting edge, said pocket also having a generally flat portion at the bottom thereof aligned with the flat bottom of said carton and supported thereby, and a soft plastic food body within said pocket with the weight of said food body supported jointly by the flat bottom of said carton and the supporting edge of said support, the walls of said pocket including the bottom portion thereof being provided with indented ornamental designs, and the design in said bottom portion having a plurality of spaced points in all directions across said design in contact with the bottom of said carton.

2. In a soft plastic food package, the combination of a vertically-extending, open-ended tubular support, an unbacked, reversible pocket formed of thin, flexible thermoplastic film disposed within said support and tapering generally inwardly and downwardly to a generally flat horizontally-extending portion at the bottom thereof, said pocket having an upper peripheral portion in contact with the upper edge of said support and being steadied thereby, while being unattached to and separable from said support, the horizontally-extending portion of said pocket lying substantially in the same plane as the bottom edge of said support so that when the bottom of said package is placed on a flat supporting surface said horizontally-extending portion of the pocket is in contact with said flat surface and supported thereby, and a soft plastic food body within said pocket conforming to the shape thereof, the walls of said pocket including the horizontally-extending portion thereof being provided with indented ornamental designs, the designs in said horizontally-extending portion having a plurality of spaced points in all directions across said design lying in substantially the same plane as the bottom edge of said support.

3. In a soft plastic food package, the combination of an outer carton, a support received within said carton and providing a supporting edge portion surrounding an opening therein, a pocket of thin flexible thermoplastic film having a peripheral portion around the mouth thereof in contact with the supporting edge of said support and being steadied thereby with the rest of said pocket being disposed below said supporting edge, said pocket also having a flat portion at the bottom thereof, a flat panel member disposed below the flat portion at the bottom of said pocket and supportingly engaging said flat bottom portion, and a soft plastic food body within said pocket with the weight of said food body supported jointly by said flat panel member and the supporting edge of said support.

4. In a soft plastic food package, an outer carton having at least one smooth surfaced panel portion, a container within said carton having at least one unbacked wall of flexible thermoplastic film bearing an indented ornamental design, said design-bearing wall resting against said smooth-surfaced panel portion, and a soft plastic food body within said container conforming to the design-bearing wall thereof, the weight of said food body being at least partially supported by said panel portion through said design-bearing wall without distorting the design in said wall.

References Cited in the file of this patent

UNITED STATES PATENTS

| | | |
|---|---|---|
| 2,631,939 | Peters | Mar. 17, 1953 |
| 2,666,710 | Peters | Jan. 19, 1954 |